July 7, 1936.  R. F. METCALFE  2,047,028
AUTOMOBILE WATER COOLING TEMPERATURE REGULATOR
Filed Nov. 30, 1931  3 Sheets-Sheet 1
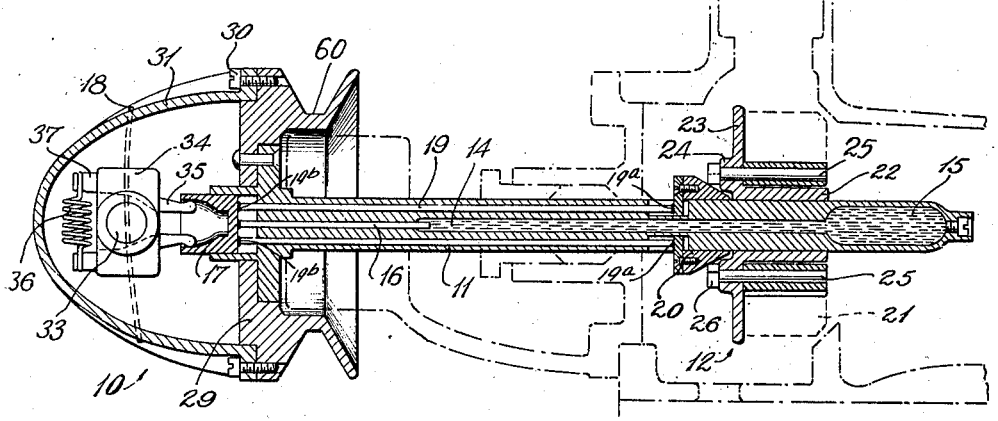
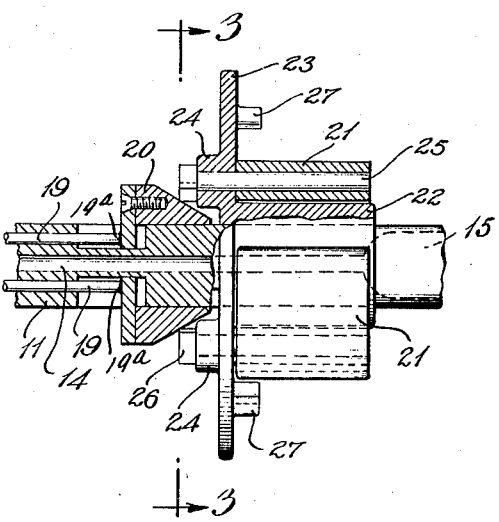
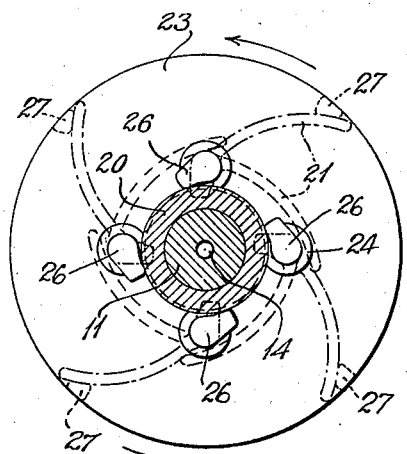
INVENTOR.
ROBERT F. METCALFE
BY Austin & Dix
ATTORNEYS.

July 7, 1936.  R. F. METCALFE  2,047,028
AUTOMOBILE WATER COOLING TEMPERATURE REGULATOR
Filed Nov. 30, 1931  3 Sheets-Sheet 2
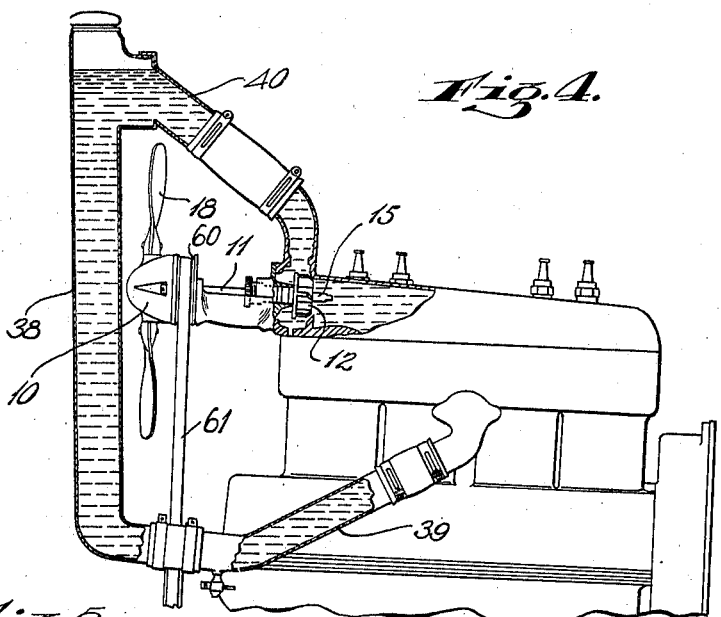
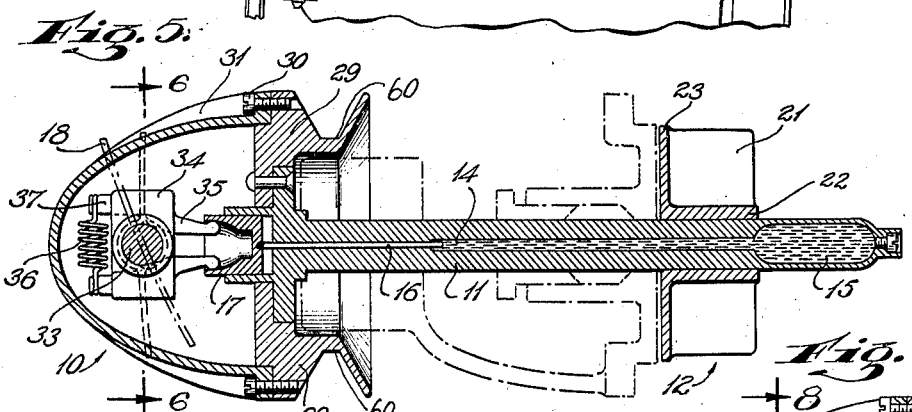
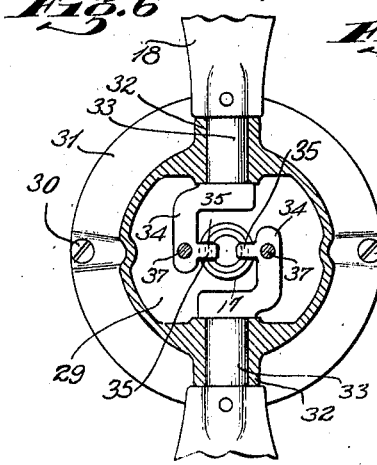
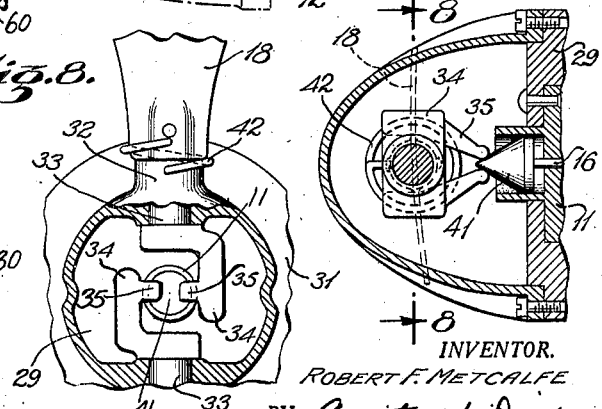
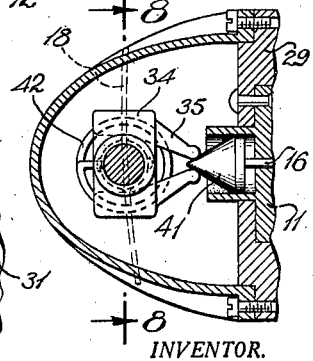
INVENTOR.
ROBERT F. METCALFE
BY Austin & Dix
ATTORNEYS.

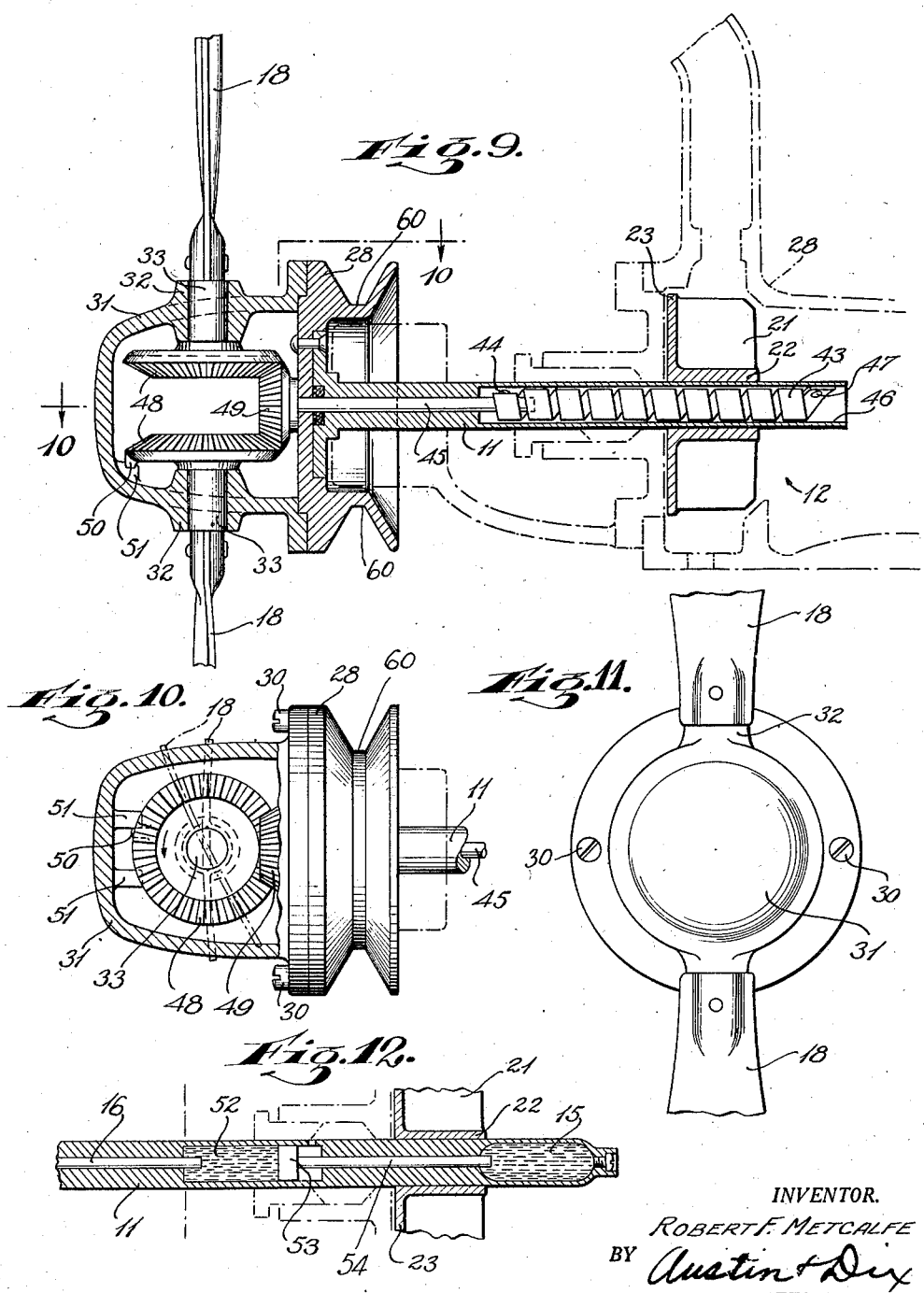

Patented July 7, 1936

2,047,028

UNITED STATES PATENT OFFICE 2,047,028

AUTOMOBILE WATER COOLING TEMPERATURE REGULATOR

Robert F. Metcalfe, Los Angeles, Calif.

Application November 30, 1931, Serial No. 577,985

3 Claims. (Cl. 123—171)

This invention relates to improvements in temperature-regulating devices, and more particularly to devices for controlling the temperature and flow of ambient media such as are used in automotive cooling systems.

Hitherto the custom has been to cool an automotive engine by circulating a cooling fluid, such as water, through the water jacket of the engine, returning it thence to a radiator mounted in the front of a machine. The flow of cooling fluid through the cooling system may be mechanical, as by using impelling pumps, motivated, through suitable mechanism, by the engine, or as in some systems, by convection circulation of the fluid. These systems have the uniform disadvantage of providing for substantially equal flow of cooling medium through an engine regardless of the temperature obtaining in the surrounding air. Thus, in a mechanical system incorporated in an automobile, the amount of fluid forced through the engine to cool the latter, is the same at any temperature, being dependent solely upon the speed of the vehicle.

It is an object of this invention to provide a cooling system for internal combustion engines, and the like, which is directly thermally responsive to the engine.

Another object of this invention is the provision of a temperature-regulating device for internal combustion engines, and the like, in which a thermo-responsive controlling unit is directly contacted with the fluid or the device whose temperature is to be regulated or maintained within desired limits.

Yet another object of this invention is the provision of such an improved device which is self-contained, simple and efficient in operation.

It is also an object of this invention to provide such improved devices which are adapted to automatically maintain a desired operating temperature within an engine or other member exposed to variations in heat.

These, and other desirable objects and advantages of the present invention will be illustrated in the accompanying drawings and described in the annexed specification, certain preferred embodiments being disclosed by way of example only, for, since the underlying principles may be incorporated in other specific mechanical constructions, it is not intended to be limited to the ones here shown, except as such limitations are clearly imposed by the appended claims.

In the drawings like numerals refer to similar parts throughout the several views, of which Fig. 1 is a vertical section through a temperature-controlling unit as applied to an automotive cooling system;

Fig. 2 is a vertical section partly in elevation of an impeller pump having cam operating means for controlling the impellers;

Fig. 3 is a front plan view taken on the line 3—3 of Fig. 2;

Fig. 4 is a side elevation of an automotive engine and cooling system showing improvements of the present invention, certain of the parts being shown in section;

Fig. 5 is a view similar to Fig. 1, showing the method of operating the fan members;

Fig. 6 is a front view of the device shown in Fig. 5, certain of the parts being shown in cross section;

Fig. 7 is a detail sectional view of a modified view of fan operating means;

Fig. 8 is a cross section taken on line 8—8 of Fig. 7;

Fig. 9 is a view similar to Fig. 1, showing modified forms of thermostatic control and fan operating means;

Fig. 10 is a cross sectional view taken on lines 10—10 of Fig. 9;

Fig. 11 is a front elevation of the device shown in Figs. 9 and 10, and

Fig. 12 is a detail of a further modified form of thermostatic control device.

In its essential details the improved device of the present invention comprehends a thermostat in direct contact with a medium or article whose temperature is to be controlled and involves an auxiliary cooling means, such as a fan, the blades of which are directly controlled by the thermostat. Auxiliary flow controlling means for a cooling medium is provided in the form of a pump, the blades for the impellers of which are varied by the thermostat in order to vary the amount of flow of the medium to be cooled.

A specific use of this type of control has been illustrated in the accompanying drawings as applied to an automobile in the cooling of the engine by means of circulation of a body of water.

In these illustrations the fan is of the usual type of radiator fan, having means embodied in the hub thereof adapted to vary the angle of the fan blades and thereby vary the flow of air impelled by the blades. The device, or devices, controlling the angularity of the fan blades is, in turn, under the control of, or actuated by, a thermostatically controlled device which is in direct contact with the cooling water in the water jacket of the cylinders of the motor. The pump shown and described herein is of the impeller type, the blades of which are also adapted to be varied by means of the same thermostatic device to control the volume of the cooling water forced or pumped through the system.

While the novel improvements herein disclosed are to be described with particular reference to their use in automotive and like cooling systems, it will, of course, be appreciated that the said improvements may be applied to other heat-exchanging systems wherein the temperature of the material to be treated is controlled by means directly actuated by the said material temperature. Such uses in heat exchangers may involve blower heating systems, oil refineries, oil cracking systems and a wide variety of industrial applications. In addition, it will be appreciated, as in case of electromotive prime motors, that the power supply may be directly controlled as by varying the power input.

Referring now more particularly to the drawings, the invention will be described with particular reference to an automotive cooling system, although, as intimated above, the invention is capable of embodiment in a wide variety of industrial uses.

The specific structure herein shown comprises a fan 10 driven by any suitable means, such as a belt, 61. The fan 10 is secured in any suitable manner to a shaft 11 on which is mounted a pump 12 included within the circulating cooling system of an engine. The shaft 11 is provided with a longitudinal central aperture 14, which is expanded at one end to form a chamber 15. The chamber 15 is adapted to contain an expansible liquid which is responsive to changes in temperature. As comprehended in the present invention the chamber 15 is contacted with or disposed so as to be in direct contact with the medium or fluid, the temperature of which is to be maintained within predetermined limits. The central channel or aperture of the shaft is restricted in diameter at its forward end so as to provide a bearing for a piston 16 which is directly connected to and adapted to operate a cam-surfaced cylindrical body member 17 having an internal cam face, and which piston is adapted to slide in a recess or chamber formed at the end of the shaft. The fan blades 18 of the fan 10 are adapted to be varied by means of suitable mechanism operated or controlled by the cam face of member 17, and which operation will be described more in detail hereinafter.

In addition to the central aperture of the shaft 11 there is also provided a pair of parallel apertures or bores which are adapted to serve as bearings for members 19, comprising a pair of rods connecting the cam member 17 with the cam member 20 disposed at the rear or pump end of the shaft. The rods 19 are severally secured to the cam members 20 and 17 as by brazing, soldering or welding, or mechanically as by means of screw threads, all as indicated generally at 19a and 19b respectively. This second cam member is adapted to vary or control the pitch of the impeller blades 21 of the impeller 12 previously described.

The pump or impeller 12 is provided with a hub 22 having a circular flange 23 integral therewith. This flange is laterally disposed with respect to the body of the hub and is provided on its outer surface with a plurality of bosses 24, which are spaced equally distant from each other and concentrically with the member 22. These bosses serve as journals for stub shafts 25, upon which are mounted impeller blades 21. These latter members, it will be appreciated, may be of any desired configuration. On the opposite face of flange 23 from bosses 24, are provided a plurality of peripheral ridges or stop members 27, which correspond in number to the impeller blades of the pump. These stops 27 are adapted to limit the outward movement of the several impeller blades. The stub shafts 25 are provided, externally of the bosses 24, with fingers 26, which are adapted to engage the cam face of member 20. When the member 20 is moved inwardly of the impeller, the fingers 26 are pushed upwardly, causing the associated blades 21 to move toward the hub in the inner dotted line position as shown in Fig. 3, and these blades are held in such position until the cam member 20 is retracted, at which time the force of the water acting against the curved blades tends to urge them outwardly toward the limiting stops 27. The pump housing and associated parts are indicated schematically in dotted lines and designated generally by the numeral 28.

It will be seen that upon expansion of the fluid contained in chamber 15, the cam member 17 will be urged outwardly, carrying therewith the links 19, which in turn will carry the cam mechanism 20 therewith. The fingers 26 of the impeller blade mechanisms will follow the diminishing curvature of the cam face and alter the angular position of the impeller blades 21 accordingly. The pump mechanism will be seen to rotate in a counter clockwise direction as viewed in Fig. 3.

Referring more particularly to Figs. 1, 5 and 6, there is disclosed a preferred form of fan-blade feathering mechanism. The base of the fan hub 29 is formed with a groove 60 adapted to receive a drive belt 61. It is obvious, of course, that the groove and associated part may be replaced by any well-known type of driving means such as sprocket and chain, or a friction drive. Secured to the base 29 by means of screws 30 is a housing 31 having peripheral bosses 32 formed therein. These bosses are so constructed as to serve as journals for the fan blade shafts 33. Secured to the fan blade shafts are arms 34 having fingers 35 formed integral therewith and positioned rearwardly thereof. These arms 34 are secured to the fan blade shafts in any suitable manner and are adapted to rotate the shafts through an angle of about 45° as indicated in the dotted line position of member 18 in Fig. 5. The fingers 35 are adapted to engage the cam face of member 17 and they are constantly urged against said face by means of a spring 36, engaging pins 37 formed on the members 34 opposite the fingers.

In operation the chamber 15 is in contact with the medium to be controlled and which is being handled by the pump. The fan and pump are driven by a belt on the pulley which rotates both the pump and fan through the medium of the shaft 11. When the temperature of the medium being handled, whether fluid or liquid, remains below a predetermined limit the liquid in chamber 15 remains normal. At this time the fan blades 18 are positioned as shown in Figs. 6 and 9, that is with the faces parallel to the axis of rotation. The blades 21 of the pump are held close to the hub 22 by the action of cam 20 on the fingers 26. With the blades 18 and 21 in the above positions the fan and pump are doing a minimum of work.

As the temperature of the medium rises the liquid in chamber 15 expands and forces plunger 16, with the attached cam member 17 to the left.

At the same time the links 19 draw the cam 20 away from the hub 22. The cam surface of cam member 17 forces the fingers 35 together thereby turning shafts 33 with their associated blades 18, until, when the maximum feathering is reached, the blades are at 45° to the axis of rotation. At this time the pump blades are also thrown out against the stops 27 thereby displacing a maximum amount of liquid. It is apparent that there are an infinite number of positions between these two limits in which the fan and pump blades may be positioned in accordance with the temperature variations in the medium being thermally regulated.

In Fig. 4 is disclosed the invention as used on an automobile for controlling the temperature of the engine cooling water. A water circulating system of a well-known type is shown using a radiator 38 connected to the water jacket by pipes 39 and 40. The cooling fan and water pump are shown operated by the same shaft 11 as described above. The water pump is positioned in the lower end of pipe 40 and pumps the water into the top of the radiator. Both the fan and pump are driven by the usual form of belt 61. The chamber or bulb 15 is in direct contact with the water in the jacket and is adapted to regulate the blades of the fan, as described above.

In Fig. 5 is disclosed the details of the regulator shown in Fig. 4. The same numerals designate like parts as in the figures described above. There is one difference, however, in that the pump blades 21 are not variable. It is, of course, understood that if desired this optional feature may be included, without departing from the spirit of the invention.

When used on an automobile the regulating device permits the engine to be operated at maximum efficiency and prevents the overheating of the cooling water with the usual undesirable results. The regulator may be set to function at the temperature at which the engine operates the best and the regulator will maintain that temperature providing the engine is operating correctly. When the temperature is below the limit set, the fan blades are so feathered that no air is circulated thereby. As the temperature rises the blades are feathered only enough to bring the temperature down to within the limits desired to permit efficient operation of the engine thereby reducing fuel costs and prolonging the life of the engine.

In Fig. 7 is disclosed a modification of the fan blade operating cam similar to cam member 17 described above. In this figure like numerals are used for like parts described above. The modified cam 41 is shown as being externally cone shaped and is adapted to cooperate with the fingers 35 in the same manner as described above. In this instance, the fingers are spread by the cam instead of drawn together. In this type of blade feathering device the spring 36 is omitted and a spring 42 substituted therefor as shown in Fig. 8. The spring 42 is of the torsion type and is secured to the boss 32 and to the fan blade 18 in such a manner as to rotate the blade in one direction while the cam and fingers tend to rotate it in the other.

In Fig. 9 is disclosed a further modified form of blade feathering device and a different type of thermostat. As above, like numerals are again used to designate similar parts. The thermal element 43 comprises a spiral metallic ribbon of suitable material disposed within the cavity of shaft 11, and one end of which is fastened at 44 to a shaft 45. The shaft 11, as noted, is formed with a large central bore 46 which accommodates the spiral element 43. The other end of the ribbon is secured at 47 to the inner surface of the bore 46. Secured to the stub shafts 33 are beveled gears 48. A cooperating driving bevel gear 49 is mounted on the outer end of shaft 45 and is rotatable therewith. The gear 49 meshes with and actuates the bevel gears 48. A thermal element of this character has the advantage over one of the liquid type in that it seldom needs attention once it is adjusted.

Each of the gears 48 has a stop lug 50 formed on the plane face thereof which is adapted to cooperate with lugs 51 formed on the inside of casing 31. These lugs form limits within which the blades 18 may be rotated.

In Fig. 12 is shown a further modification of the thermal element in which a booster is provided. It is apparent from the foregoing description that this device may be used in many types of machines some of which may have heavy blades or moving parts. The booster shown in Fig. 12 is for use in such machines. The shaft 11 is provided with two chambers similar to 15 described above. The chamber 15 is still in contact with the liquid or fluid to be regulated whereas a second chamber 52 is provided which acts as an amplifier of the energy generated in 15. The piston 16 is now acted upon by the liquid in chamber 52 which is compressed by a piston 53 mounted on a plunger 54, which is in turn actuated by the expansion of the liquid in chamber 15. It is apparent that a device of this type greatly amplifies the force generated in chamber 15, thereby permitting the rotation of heavy parts of pumps or fans.

From the above description it is apparent that a device of this type provides a self-contained device for regulating the temperature and flow of a liquid or fluid the temperature of which it is desired to maintain constant. It is also apparent that the thermostatic control may be used to vary the pump blades only, thereby regulating the rate of flow of a liquid to control the rate of heat exchange such as in refrigerating machinery, and the like. It is also apparent that the above described device will be effective regardless of the speed of the fan or pump. This feature is very desirable in connection with the water system of an automobile where the efficiency is often impaired by the reduced speed of the fan due to belt slippage.

It will be understood that the invention is capable of various modifications and changes, but such modifications and changes are to be considered as being within the scope of this invention, as outlined in the following claims:

What is claimed is:

1. In combination, a fan adapted to circulate air through a radiating device, a pump for circulating water through said device, said fan and pump being secured to a shaft, variable blades on said fan and pump respectively adapted to vary the volumetric displacement of the said air and water, a thermal element contained in said shaft and in contact with said water, said thermal element being operatively connected to said fan and pump blades to vary the position thereof in accordance with temperature changes in said water.

2. In an engine cooling system, a radiator and a water jacket for said engine, a fan and a water pump driven by said engine adapted to circulate air and water through said radiator, variable blades on said fan and pump, a thermal element in contact with the water in said jacket, and cams operatively connecting said fan and pump to said thermal element whereby the position of said blades is varied in accordance with temperature changes in said water.

3. An improved cooling system for automotive engines, comprising, in combination, a radiator and a water jacket for an engine in fluid communication, a pump in said water jacket adapted to circulate the water from the said jacket to the radiator; a fan associated with the radiator for drawing air therethrough, said fan and pump both having adjustable impelling elements; and a single thermo-responsive means in the engine directly connected to and simultaneously controlling the adjustable elements in said fan and pump.

ROBERT F. METCALFE.